United States Patent Office 3,398,225
Patented Aug. 20, 1968

---

3,398,225
COATED 2,2-DICHLOROVINYL PHOSPHATE AND POLYVINYL CHLORIDE RESIN ANTHELMINTIC COMPOSITIONS
Richard H. Bellin, Berkeley Heights, N.J., assignor to Shell Oil Company, New York, N.Y., a corporation of Delaware
No Drawing. Filed Nov. 2, 1964, Ser. No. 408,415
7 Claims. (Cl. 424—34)

ABSTRACT OF THE DISCLOSURE

Anthelmintic compositions comprising a core of 2,2-dichlorovinyl phosphate combined with a polyvinyl chloride resin which is surrounded by a pellicular coating of a polyhydric alcohol and a natural gum which in turn is overcoated with an edible moisture-resistant material.

---

This invention relates to novel anthelmintic compositions useful for control of internal parasites of domestic animals.

Internal parasites, or endoparasites, of livestock exact a large annular dollar loss to the agricultural economy. It has been reported that as much as a half billion dollars is lost annually due to the effects of these internal parasites.

In the past it has been extremely difficult to control internal parasites because the requirements of a successful anthelmintic have been very demanding. The successful anthelmintic must be safe for use at effective levels, must be relatively inexpensive to permit its economic use on a wide scale, not accumulate in animal tissues or edible products, and lend itself to mass therapy consistent with modern agricultural practices. Certain suitable anthelmintic formulations are the subject of U.S. Patent 3,166,472 and U.S. Patent 3,344,021. These formulations comprise dimethyl 2,2-dichlorovinyl phosphate (marketed under the trademark, Vapona® insecticide; commonly known as DDVP) or dimethyl 1,2-dibromo-2,2-dichloroethyl phosphate (marketed under the trademark, Dibrom; commonly known as naled) combined with a polyvinyl chloride resin.

These formulations are effective anthelmintics. However, it has been found that when the formulation is combined with an animal feed (one of the most effective and economic ways of administering the formulation), the active material tends to be lost. During storage of the treated feed at ambient temperatures, the content of the active ingredient in the treated feed declines with time. Frequently, the feed merchant or farmer has to store feed for considerable periods of time so that for these formulations to be practically useful it is necessary that a way be found to make them stable for reasonable periods of time in animal feed.

A way to stabilize such formulations has now been discovered, and a primary embodiment of this invention is the resulting novel stable anthelmintic compositions.

The primary factors which cause instability of DDVP-resin formulations in animal feed apparently arise from the character of the anthelmintic and the formulation thereof in the resin—these characteristics being ones which lead to the effectiveness of such formulations. In these formulations, the anthelmintic present on the surface and in the zone immediately adjacent to the surface, is the effective agent in the formulation. Being water-soluble, it passes from the formulation into the gastric and intestinal juices of the animal being treated and into which it has been introduced. The anthelmintic is a very good plasticizer for the resin—it forms an essentially homogeneous mixture therewith. Consequently, as the anthelmintic is lost from the surface of the formulation, more of it migrates from the interior to maintain the homogeneous character of the formulation—and thus provides further effective anthelmintic. Thus, these formulations provide controlled amounts of the anthelmintic over a period of time. However, the anthelmintic appears to be unstable when in contact with animal feed, so that when the formulation is in contact with such feed for a period of time, the anthelmintic gradually is lost.

It has been found that loss of the anthelmintic can be prevented by suitably coating the anthelmintic-resin formulation, and this invention is the provision of the suitable coating. Provision of this coating was not a simple matter: the coating had to be one that was (a) safe to the animal to be treated; (b) palatable to the animal to be treated; (c) resistant to moisture and various components of the animal feed—both to prevent penetration of such to the surface of the resin formulation, and itself be resistant to physical deterioration by such—yet of such character as not to impede contact of gastric juices and/or intestinal juices with the resin formulations; (d) resistant to diffusion of the anthelmintic to the surface of the formulation during storage; (e) insoluble with respect to the anthelmintic—so that the anthelmintic could not pass out to the surface of the coated formulation; (f) compatible with respect to the anthelmintic—the coating itself could not cause decomposition of the anthelmintic; (g) adherent to the surface of the anthelmintic-resin formulation. That the finding of a suitable coating was not a simple matter is indicated by the fact that out of a consideration variety of materials and combinations of materials investigated, only a particular combination gave satisfactory results. This combination: coating the anthelmintic-resin formulation with an intimate physical combination of at least one polyhydric alcohol and at least one natural gum, and, preferably, then overcoating the resulting formulation with a moisture-resistant coating. Preferably, the alcohol-gum coating is formed in situ by coating the anthelmintic-resin formulation uniformly with the alcohol, then mixing with powdered gum to form a free-flowing formulation. Preferably, this procedure is repeated one or more times to provide a substantial pellicular coating of the alcohol-gum admixture. After drying the formulation can be overcoated with the moisture-resistant coating by conventional methods.

Accordingly this invention provides improved particulate anthelmintic compositions of matter stable when mixed with animal feeds, said compositions comprising:

(1) A solid core of either dimethyl 2,2-dichlorovinyl phosphate or dimethyl 1,2-dibromo-2,2-dichloroethyl phosphate in solution in a polyvinyl chloride resin, (2) Said core being surrounded by a pellicular coating of an intimate physical combination of at least one polyhydric alcohol and at least one natural gum.

Preferably, the said treated core is surrounded by a pellicular surface coating of an edible moisture-resistant material.

The thermoplastic resins generally suitable for forming the resin-anthelmintic compositions for use in the method of this invention are the polyvinyl chloride resins. The essential characteristics of the suitable resins are that they be solids at temperatures encountered in storerooms and in fields, that they not absorb any appreciable amount of water (that they absorb at most about 2 percent and preferably less than 1 percent of their weight of water) and that they have substantial miscibility with the anthelmintics used in the preparation of the granular formula. Preferably the resin used is completely hydrophobic. These requirements are satisfied by thermoplastic resins have a molecular weight of 5000 or above. Suitable resins are polyvinyl chloride resins.

The organophosphorus anthelmintics contemplated by this invention are plasticizers for polyvinyl chloride resins. Consequently, the resin-anthelmintic compositions used in the method of this invention can be prepared by any of the usual processes used for introducing a plasticizer into a resin. In many cases, intimate mixing will readily affect introduction of the anthelmintic into the resin. In other cases, it may be desirable to employ a solvent to aid in introducing the anthelmintic into the resin. Fluid pastes, or "plastisols," can be made which can be molded, extruded, cast, blown or otherwise formed into such other shapes as sheets, films, rods, granules, foams, powders and the like. A preferred method of preparation is by extrusion, in which the resin and anthelmintic are mixed together at high temperatures, and the resulting solution is forced through a die under high pressure. Alternatively, the anthelmintic may be incorporated in the resin by milling, by the use of mutual solvents, and by other similar blending methods.

The amount of the anthelmintic incorporated into the resin will depend upon the physical character and activity of the anthelmintic, upon the chemical and physical character of the resin, and upon the intended physical state of the final product—whether granular, powdered, solid, foam, or the like. The critical factor in every case is the rate at which it is desired that the anthelmintic become available at the surfaces of the particles of the resin-anthelmintic compositions, and will be determined in a given case by preliminary examination readily conducted by one ordinarily skilled in the art. For ready handling, it is desirable that the composition by dry and solid to the touch, and free-flowing. To insure this state, it is necessary to maintain the concentration of anthelmintic in the composition below about seventy percent by weight. To reduce the amount of resin which must be used, it is ordinarily desirable that the concentration of anthelmintic be at least about one percent of the weight of the composition, and ordinarily is at least about twenty percent of the weight of the composition.

The compositions prepared in this way consist of the anthelmintic in solid solution in the resin, the anthelmintic being present substantially unchanged chemically.

The preparation of suitable resin-anthelmintic compositions is described in detail in U.S. Patent 3,318,769.

According to the invention, coatings comprising one or more of certain polyhydric alcohols and one or more natural gums have been found effective in overcoming these instability problems of resin-anthelmintic compositions. Polyhydric alcohols suitable according to the invention are those which are highly water soluble, are viscous liquids or if solids form viscous aqueous solutions and are non-toxic to warm-blooded animals. It is desirable that such alcohols be at least 50 percent soluble in water and that a concentrated aqueous solution thereof be viscous—having a viscosity of about 40 centistokes at 20° C. Such polyhydric alcohols include, for example, propylene glycol, 1,3-butanediol, 1,4-butandiol, glycerol, 1,2,3-hexanetriol, erythritol, arabitol, sorbitol, dulcitol, among others. The hydrates of certain polyhydric alcohols may be used as well.

Because of its excellent physical properties, ready availability, and excellent compatability with natural gums, sorbitol is a preferred polyhydric alcohol.

Also preferred is glycerol because of its availability in commercial quantities and its low cost.

Natural gums possess the necessary properties to be used in conjunction with the polyhydric alcohol. These gums are characterized by being products of plant metabolism which are complexes of polysaccharides composed of hexosans and pentosans. They are anionic and are generally soluble in polar solvents. They include such products as tragacanth, acacia (arabic), asafetida, guaiac, gamboge, guar, karaya, sweetgums, and the like. A preferred gum because of its availability, low cost, and the excellent adhesive properties in admixtures with the polyhydric alcohols is gum arabic.

The edible moisture-resistant overcoating material may be selected from a variety of such coating materials known in the art. These include shellac, shellac with n-butyl stearate, shellac with wool fat, shellac with cetyl alcohol, ammoniated shellac, cellulose acetate, collodion, formalized gelatin, salol, salol and shellac, and keratin, to name a few. Edible grade of shellac is preferred because of its physical properties and palatability to domestic animals.

Preferably, successive layers of the coating consisting of the combination of polyhydric alcohol and the gum are "built-up" over anthelmintic-resin particles as follows: A highly concentrated aqueous solution of the polyhydric alcohol is applied to a particulate anthelmintic-resin formulation to thoroughly wet the particles. It is advantageous to use as high a concentration of the polyhydric alcohol as possible in the solution to avoid problems of removing the solvent. Concentrations in excess of 50% by weight of the polyhydric alcohol are desirable, although in certain cases it may be possible to use solutions containing as low as 20% of the alcohol. The polyhydric alcohol solution may be poured on the particles, dispensing small portions at a time over the particles as they rotate in the pan coater, the solution may be sprayed over the rotating particles, or it may be dispensed automatically at preset intervals in predetermined quantities necessary to uniformly cover the particles. To uniformly coat the particles and to permit rapid evaporation of the solvent, the particles are coated in a rotating pan coater provided with air streams of controlled temperature.

To insure a uniform coating of the individual particles powdered natural gum is applied to the rotating coated pellets. The powdered gum may be applied as a dust either by manually distributing the dust in measured quantities over the rotating particles or by having the dust released automatically in predetermined amounts and at preset times from storage hoppers so that the released quantity is uniformly distributed over the rotating particles.

The coated pellets conveniently are air dried. This can be accomplished by spreading the coated particles over a large surface area and allowing the particles to dry at room tempertaure. Preferably, however, the particles are dried by application of a stream of warm air over the particles as they rotate in the pan coater. After drying, the coated particles preferably are given an edible overcoating. The overcoating is applied in solution. The concentration of the overcoating in the solvent found satisfactory is 35 percent by weight of solvent, although as little as 10 percent or as much as 50 percent may be suitable in certain cases. The solvent for the overcoating agent can be selected from a number of volatile polar solvents, such as ethanol, methanol, isopropanol, acetone and the like. The choice of the overcoating agent will determine the selection of the solvent and the concentration employed. Ethanol has been found to be highly satisfactory solvent for edible shellac, the overcoating of choice. Concentrations of 35 percent by weight of shellac in ethanol have proved satisfactory although concentrations of as little as 10 percent to as much as 50 percent may be employed.

In certain cases a single layer of the overcoating and undercoating may be sufficient, but more frequently, to insure thorough, complete coating of the particles several coats of the undercoating and overcoating are required. For example, as many as 10 to 15 coats of the polyhydric alcohol solution-natural gum combination may be necessary as an undercoating and as many as 5–10 coats of the overcoating may be required.

The finished coated product may be dusted with an inert dusting powder to insure against agglomeration and to ensure free-flowability of the coated particles. As little as one-tenth to one-half the quantity of the overcoating of the inert dust may be employed. The inert dust may be selected from natural mineral dusts, synthetic inert dusts or botanical inert dusts. U.S.P. talcum has been found satisfactory when such a dust was considered desirable.

Usually two to five times as much of the natural gum will be required as the quantity of polyhydric alcohol, while only about one-tenth the quantity of the overcoating is necessary as the quantity of natural gum. Naturally, the choice of undercoating and overcoating materials will influence the ratio of the coating ingredients.

The thickness of the total coating may vary. It will depend upon the choice of anthelmintic, the concentration of the anthelmintic in the resin, the size of the anthelmintic-resin particle and the choice of coating agents. As much as 80% by weight of an individual particle may consist of the coating layers or as little as 20% by weight of the particle may be coating. While the preferred thickness of the coating ranges from about 0.01 to 0.02 of an inch, under certain circumstances, it may be desirable to coat the particles only 0.005 inch thick while on other occasions a thickness of as much as 0.05 inch may be required.

The following examples are presented to illustrate how certain compositions according to this invention are prepared and to demonstrate the properties of such compositions. These examples are not to be considered in any way as limiting the scope of the invetion.

EXAMPLE I.—PREPARATION OF DDVP-PVC COATED PELLETS

DDVP-polyvinyl chloride (PVC) pellets, containing 20% DDVP in PVC, prepared as described in U.S. Patent 3,318,769 are screened through a No. 10 U.S. Standard sieve to remove any large pellets. For each 2270 grams (5 pounds) of pellets placed in the coating pan, 1578 grams of U.S.P. grade of 70% sorbitol and 2195 grams of gum arabic (U.S.P. grade) are added in small portions as the pan is rotated. Sufficient sorbitol solution is poured onto the revolving pellets to wet them thoroughly without using excess, yet achieving a uniform coating without causing the pellets to "ball." Enough gum arabic is then dusted on to absorb the sorbitol and permit a free flowing mixture. The material is permitted to rotate for about 5 minutes before applying the second coating. After 4 or 5 coats an air stream is directed over the rotating coated pellets for 15-20 minutes. After 4 to 5 coats the drying cycle is repeated and then a stream of warm air (120–130° F.) is introduced. About 12 to 13 coats of sorbitol-gum arabic are required to build up a coating of about 58% by weight. After the undercoating materials have been added, the coated pellets are dried for 10–15 hours with warm air. After drying, the coated pellets are rescreened through a No. 7 screen and next placed in a rotating pan for overcoating which consists of 3 grams of shellac in ethyl alcohol per 100 grams of pellets. This is applied in 2 to 3 portions. About one gram of talc is dusted on for each three grams of shellac used. After an application of shellac and talc, the material is rotated in cool air for about 20 minutes, followed by warm air for 20 minutes, and followed by cool air for 10–15 minutes. The yield of double coated DDVP-PVC pellets according to this coating process was 12 pounds.

EXAMPLE II.—STABILITY OF COATED PELLETS AT HIGH HUMIDITY

Samples of 20 percent DDVP-PVC pellets coated according to Example I and non-coated pellets of the same concentration were mixed with animal feed, stored at 100° F. and 70% relative humidity for two weeks, then the DDVP content of each formulation was analyzed by infra red analysis. The results were:

| | Percent |
|---|---|
| DDVP remaining in uncoated pellets | 37 |
| DDVP remaining in coated pellets | 96 |

EXAMPLE III.—STABILITY OF COATED PELLETS AT HIGH TEMPERATURE

Samples of 20% DDVP-PVC pellets coated according to this invention and uncoated 20% DDVP-PVC pellets in animal feed were subjected to storage conditions of 130° F. and 5% relative humidity for two weeks and then the DDVP content of each formulation was analyzed by infra red analysis. The results were:

| | Percent |
|---|---|
| DDVP remaining in uncoated pellets | 21 |
| DDVP remaining in coated pellets | 95 |

EXAMPLE IV.—PREPARATION AND STABILITY OF DDVP-PVC PELLETS COATED WITH GLYCEROL-GUM ARABIC

DDVP-polyvinyl chloride (PVC) pellets, containing 20% DDVP in PVC are screened through a No. 10 U.S. Standard screen to remove any large pellets. For each 2270 grams (5 pounds) of pellets placed in the coating pan, 680 grams of glycerine (U.S.P. grade) and 3100 grams of gum arabic (U.S.P. grade) are added in small portions as the pan is rotated. Sufficient glycerol is poured onto the revolving pellets to wet them thoroughly without using excess, then enough gum arabic powder is dusted on to permit a free flowing mixture. It is not necessary to dry the mixture between applications of coating. About 5 to 6 coats of glycerol-gum arabic are required to build up a coating of about 58% weight. After the undercoating materials have been added, the coated pellets are dried for 10 to 15 hours with warm air (120 to 130° F.) After drying, the coated pellets are rescreened through a No. 7 screen and next placed in a rotating pan for overcoating which consists of 3 grams of shellac in ethyl alcohol per 100 grams of undercoated pellets. This is applied in 2 to 3 portions. About one gram of talc is dusted on for each three grams of shellac solution used. After an application of shellac and talc, the material is rotated in cool air for about 20 minutes followed by warm air for 20 minutes, and followed by cool air for 10 to 15 minutes. The yield of the double coated DDVP-PVC pellets according to this coating process was 12 pounds.

Samples of 20 percent DDVP-PVC pellets coated according to this example and non-coated pellets of the same concentration were mixed with animal feed, stored at 100° F. and 70% relative humidity for two weeks, then the DDVP content of each formulation was analyzed by infrared analysis. The results were:

| | Percent |
|---|---|
| DDVP remaining in uncoated pellets | 37 |
| DDVP remaining in coated pellets | 97 |

After particles were coated according to this invention they were found to remain firm and intact for prolonged storage periods. They remained freely flowable and did not agglomerate. When mixed with feed they retained their excellent physical properties—i.e., they remained unshattered after blending and after storage showed no tendency of bleeding of the active component.

The animal feed containing coated pellets according to this invention has provided control of internal parasites of swine equal to the control provided by fresh uncoated DDVP-PVC formulation administered orally to the animals.

I claim as my invention:

1. An improved particulate anthelmintic composition of matter wherein each particle is characterized by:
   (a) a solid core consisting essentially of an anthelmintic, dimethyl 2,2-dichlorovinyl phosphate, in solution in a polyvinyl chloride resin;
   (b) said solid core being surrounded by a pellicular coating of an intimate physical combination of at least one polyhydric alcohol characterized by being water soluble, forming viscous aqueous solutions, and of a low order of mammalian toxicity and at least one natural gum;
(c) said coated core being overcoated with an edible moisture-resistant material selected from shellac, shellac with n-butyl stearate, shellac with wool fat, shellac with cetyl alcohol, ammoniated shellac, cellulose acetate, collodion, formalized gelatin, salol, salol and shellac, or keratin.

2. An improved particulate anthelmintic composition of matter wherein each particle is characterized by:
(a) a solid core consisting essentially of dimethyl 2,2-dichlorovinyl phosphate in solution in polyvinyl chloride resin;
(b) said solid core being surrounded by a pellicular coating of an intimate physical combination of at least one polyhydric alcohol characterized by being water soluble, forming viscous aqueous solutions, and of a low order of mammalian toxicity and at least one natural gum;
(c) said coated core being overcoated with an edible moisture-resistant material selected from shellac, shellac with n-butyl stearate, shellac with wool fat, shellac with cetyl alcohol, ammoniated shellac cellulose acetate, collodion, formalized gelatin, salol, salol and shellac, or keratin.

3. An improved particulate anthelmintic composition of matter wherein each particle is characterized by:
(a) a solid core consisting essentially of dimethyl 2,2-dichlorovinyl phosphate in solution in polyvinyl chloride resin;
(b) said solid core being coated by a plurality of successive layers of a pellicular coating of an intimate physical combination of at least one polyhydric alcohol characterized by being water soluble, forming viscous aqueous solutions, and of a low order of mammalian toxicity and at least one natural gum;
(c) said coated core being overcoated with a plurality of successive layers of an edible moisture-resistant material selected from shellac, shellac with n-butyl stearate, shellac with wool fat, shellac with cetyl alcohol, ammoniated shellac, cellulose acetate, collodion, formalized gelatin, salol, salol and shellac, or keratin.

4. An improved particulate anthelmintic composition of matter wherein each particle is characterized by:
(a) a solid core consisting essentially of dimethyl 2,2-dichlorovinyl phosphate in solution in polyvinyl chloride resin;
(b) said solid core being coated by a plurality of successive layers of sorbitol and gum arabic;
(c) said coated core being overcoated with a plurality of successive layers of edible shellac.

5. An improved particulate anthelmintic composition of matter wherein each particle is characterized by:
(a) a solid core consisting essentially of dimethyl 2,2-dichlorovinyl phosphate in solution in polyvinyl chloride resin;
(b) said solid core being coated by a plurality of successive layers of glycerol and gum arabic;
(c) said coated core being overcoated with a plurality of successive layers of edible shellac.

6. A process for the preparation of an improved particulate anthelmintic composition which process comprises coating a solid core of an anthelmintic, comprising dimethyl 2,2-dichlorovinyl phosphate in solution in a polyvinyl chloride resin, with successive layers of a polyhydric alcohol-natural gum intimate admixture and followed by overcoating the resulting pellicular undercoating with successive layers of an edible moisture-resistant material selected from shellac, shellac with n-butyl stearate, shellac with wool fat, shellac with cetyl alcohol, ammoniated shellac, cellulose acetate, collodion, formalized gelatin, salol, salol and shellac, or keratin.

7. An improved particulate anthelmintic composition of matter wherein each particle comprises a solid core of an anthelmintic, consisting essentially of dimethyl 2,2-dichlorovinyl phosphate in solution in a polyvinyl chloride resin, with successive layers of a polyhydric alcohol-natural gum intimate admixture, and followed by overcoating the resulting pellicular undercoating with successive layers of an edible moisture-resistant material selected from shellac, shellac with n-butyl stearate, shellac with wool fat, shellac with cetyl alcohol, ammoniated shellac, cellulose acetate, collodion, formalized gelatin, salol, salol and shellac, or keratin.

References Cited

UNITED STATES PATENTS

| | | | |
|---|---|---|---|
| 2,841,528 | 7/1958 | Myhre | 167—82 |
| 2,878,160 | 3/1959 | Smedresman | 167—82 |
| 3,084,104 | 4/1963 | Tuerck et al. | 167—82 |
| 3,145,146 | 8/1964 | Lieberman et al. | 167—82 |
| 3,166,472 | 1/1965 | Menn et al. | 167—53 |
| 3,179,561 | 4/1965 | Kuebler et al. | 167—53 |
| 3,200,039 | 8/1965 | Thompson | 167—82 |
| 3,318,769 | 5/1967 | Falckemer et al. | 167—42 |
| 3,344,021 | 9/1967 | Menn et al. | 167—53 |

OTHER REFERENCES

"ATGARD-C" (Shell's animal anthelmintic) Registered Trademark No. 792,103, registered July 6, 1965 (date of first use in commerce July 20, 1964).

LEWIS GOTTS, *Primary Examiner.*

S. K. ROSE, *Assistant Examiner.*